Oct. 25, 1949.  H. SAUCET  2,485,926

SEALED DEMOUNTABLE JOINT FOR VACUUM TUBES

Filed July 16, 1946

INVENTOR
HENRI SAUCET
By John Q. Brady, attorney

Patented Oct. 25, 1949

2,485,926

UNITED STATES PATENT OFFICE 2,485,926

SEALED DEMOUNTABLE JOINT FOR VACUUM TUBES

Henri Saucet, Paris, France, assignor to Societe Francaise Radio Electrique, a corporation of France Application July 16, 1946, Serial No. 684,055
In France February 20, 1945

Section 1, Public Law 690, August 8, 1946
Patent expires February 20, 1965

4 Claims. (Cl. 285—111)

1

This invention is relating to sealed demountable joints for vacuum tubes. The junctions by means of joints, whether sealed or not, which have been used, up to the present time, in the construction of demountable vacuum tubes, present, inter alia, the following drawbacks:

(1) Overheating of an important part of the tube during the closing or demounting operation;

(2) Use of a special gaseous atmosphere in order to avoid oxidizing of the inner parts of the tube;

(3) Difficulty in achieving sufficient tightness.

The present invention has for its object the construction of a vacuum tube having one or more sealed demountable joints, with which the closing operation is carried out with a minimum of local overheating, without necessitating a special protecting gaseous atmosphere, and the constituting elements of the tube being perfectly interchangeable.

My invention consists essentially in the use of a joint constituted by two pieces of alike or different metal, separated in either case by an intermediary piece of another metal, liable to be attached by an appropriate chemical reagent and assembled one to the other by electric welding or by pressing; the demounting of the joint will be then achieved by dissolving the intermediary metal by means of the chemical reagent that does not attack the two welded pieces, without it being necessary of heating the joint energetically.

Figure 1:
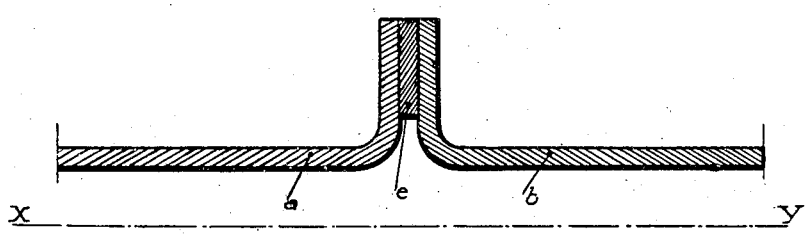
Figure 2:
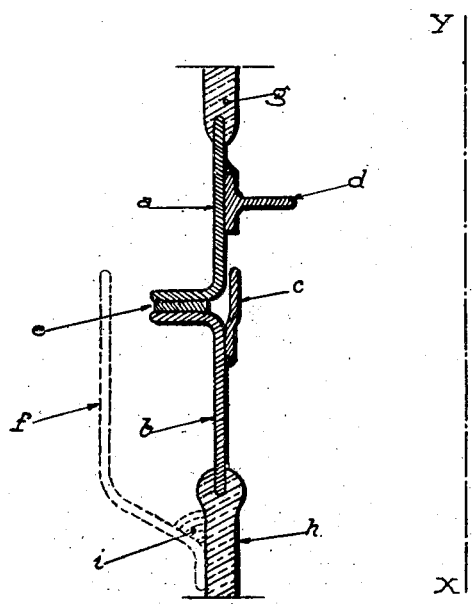

Figures 1 and 2 herewith annexed illustrate nonlimiting examples of applications of a process in accordance with the invention for constructing valves for a transmitter of a great power.

Fig. 1 is a diagrammatic view, representing in section on a plane passing through the axis XY of a vacuum tube of the construction of a joint between two pieces of ferro-nickel a, b, with an intermediary strip of copper; the assembling is carried out by electric welding or by press-work. The demounting of the joint is achieved by dissolving the copper into nitric acid, which has practically no action on ferro-nickel.

Fig. 2 shows a section of the annular grid terminal of a vacuum tube of a great power, on axis XY; the pieces a, b, c, d, are made of ferro-nickel, the intermediary strip e is of copper; the piece g is the glass portion of the cup base of the valve; the part h is the glass tubing connecting the grid outlet terminal to the anode; the piece d is an interior ring, on which the grid is fixed; the piece c permits of centering and mechanically nesting the two pieces a and b constituting the grid outlet terminal; besides, during the demounting the piece protects the interior of the valve against outflows of acid; and the part f

2 constitutes the vessel into which the acid is disposed, that is used for attacking the copper a during the demounting of the valve, the bottom of the vessel being made tight by a thread of mastic i.

What I claim is:

1. A joint for demountable vacuum tubes, characterized by it being constituted by two metallic pieces welded on either side of an intermediate element of a metal differing from that of the said two metallic pieces and of such a nature that it may be dissolved by a chemical product having no perceptible action on both said metallic pieces.

2. A joint for demountable vacuum tubes, as set forth in claim 1, characterized by it being constituted by two pieces of ferro-nickel welded on either side of an intermediate element of copper.

3. A joint for demountable vacuum tubes, comprising two metallic rings having integrally connected flanges, an intermediate metallic blank interposed between the flanges and welded thereto, the metal of the intermediate blank being different from that of the rings and of such a nature that it may be dissolved by a chemical product having no perceptible action on the three said rings and a protecting ring secured to one of said metallic rings and extending in substantially spaced relation to the interior thereof from the secured position on one of said rings to a position substantially beyond said intermediate blank and terminating in alignment with a portion of the other of said rings.

4. A joint for demountable vacuum tubes as set forth in claim 1, having two annular metal pieces disposed face to face, the facing edges of the said pieces being folded outwardly at a right angle, an intermediate metal washer interposed between the said folded edges and welded to the said edges, and an annular metal piece disposed opposite the said washer in the interior of the two aforementioned annular pieces, and welded to one of the said pieces remote from the folded edge thereof, the metal of the intermediate washer being different from that of the annular pieces, and such that it can be dissolved by a chemical product without an appreciable action on the aforementioned three annular pieces.

HENRI SAUCET.

REFERENCES CITED

The following references are of record in the file of this patent:

UNITED STATES PATENTS

| Number | Name | Date |
|---|---|---|
| 58,516 | Wedekind | Oct. 2, 1866 |
| 2,309,967 | Litton | Feb. 2, 1943 |